United States Patent

[11] 3,611,192

[72] Inventor George Allan Swartz
Princeton, N.J.

[21] Appl. No. 887,521
[22] Filed Dec. 23, 1969
[45] Patented Oct. 5, 1971
[73] Assignee RCA Corporation

[54] BULK SEMICONDUCTOR NEGATIVE RESISTANCE LOADED SLOW-WAVE DEVICE AMPLIFIERS AND OSCILLATORS
7 Claims, 7 Drawing Figs.

[52] U.S. Cl. 331/96, 330/5, 331/107 G, 333/31 C
[51] Int. Cl. H03b 7/14
[50] Field of Search 331/96, 107 R, 107 G; 330/5, 5.5; 333/31 R, 31 C

[56] References Cited

UNITED STATES PATENTS 3,464,020 8/1969 Koyama et al. 330/5

*Primary Examiner*—Roy Lake
*Assistant Examiner*—Siegfried H. Grimm
*Attorney*—Edward J. Norton

ABSTRACT: A microwave device comprising a meander line in cooperative surface relationship with a slab of material, such as GaAs having an N-type semiconducting longitudinally distributed center portion and intrinsic insulating outer portions. The thickness of the slab is sufficiently thin and the density of electrons in the center portion is sufficiently low to prevent the formation of domains when a longitudinal electric field sufficient to bias the center portion into a region of negative differential mobility is applied. A DC voltage supply coupled to contacts on either end of the slab provides this field.

Figure 1A:
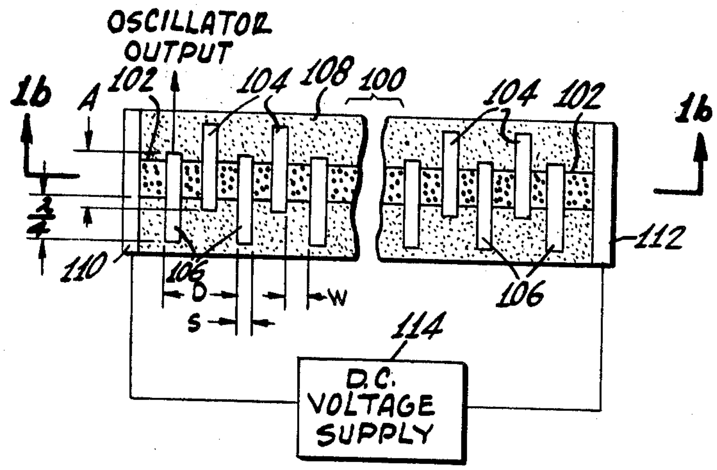

The microwave device, which is simply fabricated by integrated circuit techniques, operates as a negative resistance loaded slow wave structure, wherein the phase velocity of a propagated wave is many times the carrier drift velocity, to cause a wave to experience gain when propagated by the meander line slow wave structure of the microwave device.

MICROWAVE OSCILLATOR

MICROWAVE OSCILLATOR

INVENTOR.
GEORGE A SWARTZ
BY George J. Seligsohn
Attorney

INVENTOR
GEORGE A. SWARTZ
BY George J. Seligsohn
Attorney

BULK SEMICONDUCTOR NEGATIVE RESISTANCE LOADED SLOW-WAVE DEVICE AMPLIFIERS AND OSCILLATORS

This invention relates to microwave devices and more particularly, to negative resistance loaded slow wave structures providing gain at microwaves.

In an article entitled "Coupling Between Slow-Waves and Convective Instabilities in Solids," by J. M. Hammer appearing on pages 358–360 of Volume 10, No. 12, Applied Physics Letters, 15 June 1967, there is discussed a solid-state analog of a conventional traveling-wave tube in which drifting carriers in semiconductor materials which exhibit negative differential mobility, such as GaAs, interact with electromagnetic waves carried by slow wave structures, which waves have phase velocities comparable to the velocity of the drifting carriers. This article suggests that when the wave phase velocity is a little higher than, but still comparable to, the electron drift velocity in a semiconducting material, such as GaAs the presence of negative differential mobility provides gain by a process which is analogous to that of a traveling-wave tube. This process demands that substantial synchronism exist between the wave phase velocity and the carrier drift velocity.

Since carrier-drift velocities in semiconductors are in the order of $2\times10^{7}$ cm./sec., while the velocity of electromagnetic waves approach $3\times10^{10}$ cm./sec. (the exact velocity depending on the dielectric constant of the semiconductor material), a great degree of slowing is required to obtain phase velocities on the order of high-field, carrier-drift velocities in semiconductors. As specifically set forth in the article, structures capable of providing this required great degree of slowing, in order to make the wave phase velocity comparable to the carrier-drift velocity, present new problems in wave launching and circuit design. The fact is that to provide a degree of slowing on the order of 1,000, which is required, necessitates slow wave structures having accurate spacings of adjacent ones of a series of elements such as interdigital elements, of only 1 or 2 microns, which are very difficult if not impossible to realize at this time.

The present invention is like the disclosed subject matter of the Hammer article only to the extent that it is also directed to taking advantage of the differential negative mobility exhibited by drifting carriers in semiconducting materials, such as GaAs, to provide gain in an electromagnetic wave which interacts with drifting carriers exhibiting differential negative mobility. However, unlike the disclosed subject matter of the Hammer article, the present invention is not directed to a solid state analog of a conventional traveling-wave tube. Further, in the present invention it is not required that the phase velocity of the electromagnetic wave be comparable to the carrier drift velocity because no synchronism between the two is required. In fact, the phase velocity of the electromagnetic wave in the present invention is made many times the carrier drift velocity, although it is still slowed somewhat by a slow wave structure having element dimensions which are much larger than one or two microns, and are, therefore, readily realizable.

In the present invention, a negative resistance loaded slow-wave structure is effective in causing the AC field of the wave to enter the semiconductor material and to increase the time that the AC field from any portion of an electromagnetic wave is in cooperative relationship with the drifting carriers of the material. This increases the amount of interaction between the field and the carriers.

The advantages of the invention claimed herein includes the simplicity of fabrication of a microwave device, capable of operating as a millimeter wave oscillator or amplifier, having a relatively large coupling structure by techniques which are adaptable to integrated circuitry.

It is therefore an object of the present invention to provide interaction between a slow wave structure and a negative resistance semiconducting material which results in substantial power gain at wave phase velocities much greater than the electron drift velocity.

Figure 1B:
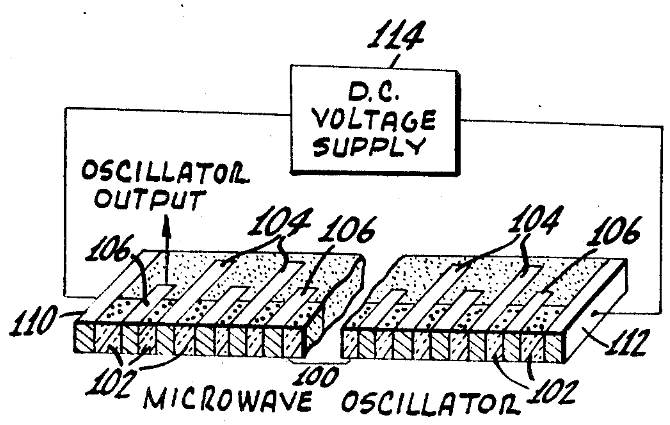
Figure 2:
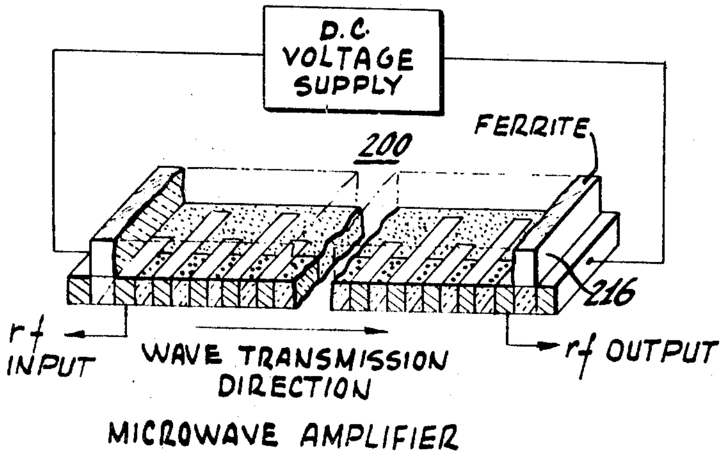
Figure 3A:
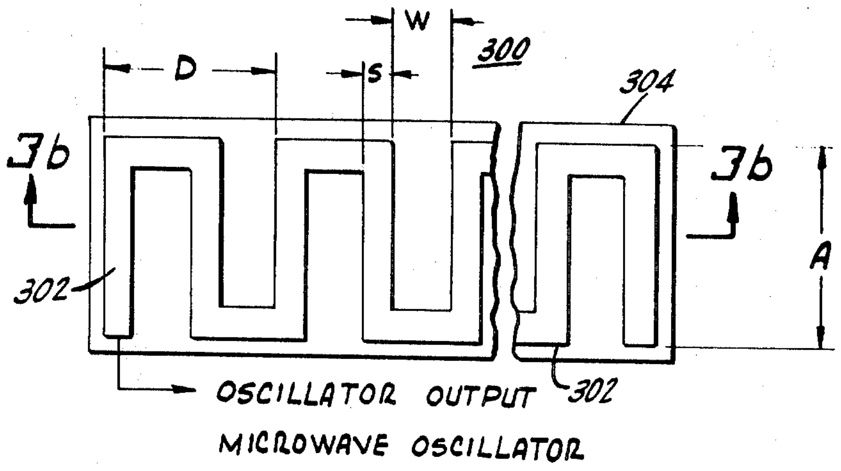
Figure 3B:
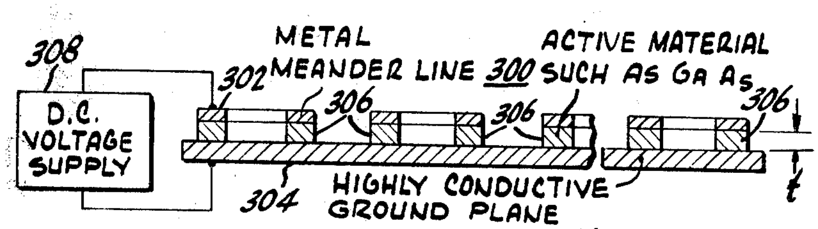
Figure 4A:
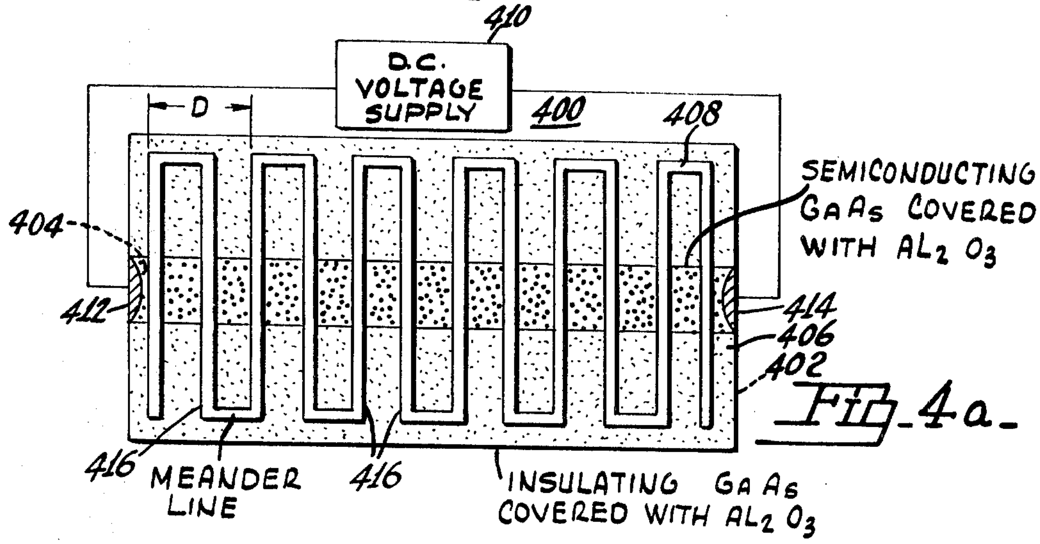
Figure 4B:
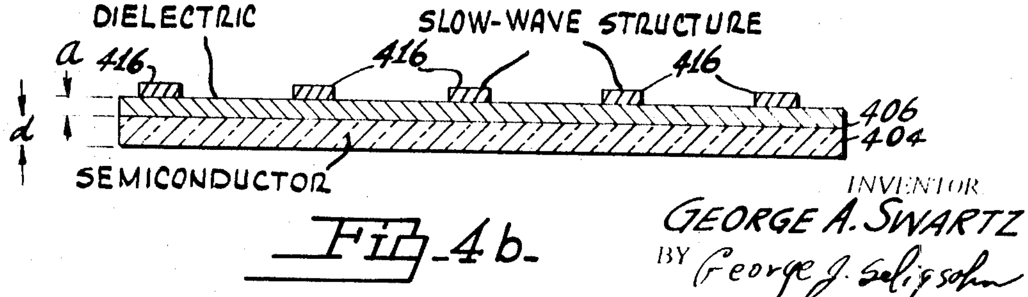

This and other objects, features and advantages of the present invention will become more apparent from the following detailed description taken together with the accompanying drawing, in which:

FIGS. 1*a* and 1*b*, respectively, are top and sectional views of a first embodiment of a microwave device which operates as a microwave oscillator;

FIG. 2 is a modification of the embodiment shown in FIGS. 1*a* and 1*b*, which operates as a microwave amplifier;

FIGS. 3*a* and 3*b*, respectively, are top and sectional views of a second embodiment which operates as a microwave oscillator;

FIGS. 4*a* and 4*b*, respectively, are a top view and a partial enlarged sectional view of a third embodiment of a microwave device, which operates as a microwave oscillator.

Referring now to FIGS. 1*a* and 1*b*, a microwave device 100 comprises a properly doped active semiconductor material 102 capable of exhibiting negative differential mobility, such as GaAs, which is longitudinally distributed, in the manner shown, as a plurality of separated segments.

Microwave device 100 further includes an open ended interdigital slow wave structure in cooperative relationship with longitudinally distributed semiconductor material 102. This interdigital slow wave structure comprises first and second sets of interdigitated finger electrodes. Finger electrodes of one set are designated by the reference numeral 104 and finger electrodes of the other set are designated by the reference numeral 106, as indicated in FIG. 1*a*. These finger electrodes are composed of conducting material, such as metal.

Microwave device 100 further includes insulated matrix 108, which may be composed of high resistance intrinsic semiconductor material, such as GaAs, or a plastic, for example. Matrix 108 supports active semiconductor material 102, fingers 104 and fingers 106 in proper cooperative relationship with respect to each other. In addition, microwave device 100 includes left end electrode 110 and right end electrode 112.

As indicated in FIG. 1*a*, the length of each segment of active semiconductor material 102 between each pair of finger electrodes 104 and 106 is equal to the same value W. The width of each finger electrode is the same value S. The total distance between corresponding points of successive finger electrodes of the same set, i.e., the periodicity of the slow wave structure, is the same value D, which is equal to 2W+2S.

A DC voltage of a predetermined value from DC voltage supply 114 (which may be either a steady DC or a DC pulse) is applied between left end electrode 110 and right end electrode 112 of microwave device 100. The value of this predetermined voltage is chosen such that it will produce an electric field between each pair of adjacent finger electrodes 104 and 106 sufficient to cause each segment of active semiconductor material 102 therebetween to be biased into a region of negative differential mobility. At the same time, for the purposes of the present invention, it is necessary that Gunn-type oscillations caused by domain formations be prevented. As is known in the art, domains will form if the product of the carrier concentration in the active semiconductor 102 and the distance W between each pair of adjacent finger electrodes is at least equal to $1.6\times10^{11}$/cm.$^2$. Therefore, to prevent domain formations, the carrier concentration of active semiconductor material 102 is chosen such that the product of this chosen concentration and the dimension W is less than $1.6\times10^{11}$/cm.$^2$.

The lowest frequency at which there is a maximum in negative conductance is related to the dimension W through the transit time of carriers which travel at a predetermined average drift velocity. The dimension W is chosen to be equal to the quotient of this average drift velocity divided by a chosen frequency at which microwave device 100 is designed to operate as a microwave oscillator.

For example, the chosen operating frequency may be $10^{10}$ hertz (X-band). If a voltage from DC voltage supply 114 of sufficient magnitude is applied to microwave device 100 to produce an electric field sufficiently high to provide negative differential mobility, an average drift velocity in GaAs of approximately $2\times10^{7}$ cm./sec. will be obtained. Dividing this average drift velocity by the chosen frequency of $10^{10}$ hertz will result in the dimension W being equal to $2\times10^{13}$ cm. Further, if the dimension S is chosen to be equal to the dimension W, the dimension D will equal 4W, i.e., $8\times10^{13}$ cm.

In free space, where the velocity of electromagnetic waves is $3\times10^{10}$ cm./sec., a wavelength of 3 cm. corresponds to a frequency of $10^{10}$ hertz. However, the velocity and wavelength of electromagnetic waves within the semiconductor, such as GaAs, is lowered by a factor equal to the reciprocal of the square root of the dielectric constant of the semiconductor material. The dielectric constant of GaAs is approximately equal to 13.5. Therefore, the wavelength of electromagnetic waves in GaAs semiconductor material is only about 0.82 cm.

It can be shown that the pass band for an interdigital line of the type shown in FIGS. 1*a* and 1*b* is given by the following formula:

$$2A+D<\lambda<4A+2D,$$

where A and D respectively, are the dimensions A and D of the interdigital slow wave structure of microwave device 100 shown in FIG. 1*a*, and λ is the wavelength of electromagnetic waves within the active semiconductor material corresponding to the chosen frequency. (As shown in FIG. 1*a*, the overall height of a finger electrode of either set is equal to the sum of a first portion having a dimension A, which overlaps the first portion of the finger electrodes of the other set, and a stub portion having a dimension λ/4 which extends beyond the end of the finger electrodes of the other set.) In the example discussed above, where λ equals about 0.82 cm., the length of each λ/4 stub is 0.205 cm., and in accordance with the above formula the dimension A may be chosen to be about λ/3 or 0.27 cm., which is in the center of the pass band.

In operation, finger electrodes 104 and 106 of microwave device 100 form a slow wave structure transmission line which is loaded by the negative resistance of active semiconductor material 102 when the latter is properly biased. Since, in the above example, the wavelength λ is equal to 0.82 cm. and the periodicity dimension D is equal to $8\times10^{13}$ cm., it will be seen that the slow wave structure is effective in slowing the wave by a factor of about 100. This provides an effective phase velocity of about $8.2\times10^{7}$ cm./sec. for the wave propogated the length of the slow wave structure. This phase velocity is over four times as great as the average carrier drift velocity of $2\times10^{7}$ cm./sec., and is clearly not comparable or synchronized therewith. Since this is true, microwave device 100 is just as effective in propogating a wave in a direction from left to right as it is in the opposite direction from right to left. Further, any wave of wavelength λ travelling in either direction will experience a negative attenuation, i.e., gain, by interaction with the negative resistance of the properly biased active semiconductor material loading the slow wave structure. Since the direction of travel of such a wave will be reversed by reflection at either end of microwave device 100, microwave device 100 will operate as a microwave oscillator to produce oscillations at a wavelength λ corresponding to a frequency of about $10^{10}$ hertz in the above described example. Suitable microwave coupling means, not shown, may be coupled to one of the finger electrodes to obtain an oscillator output, as indicated in FIGS. 1*a* and 1*b*.

The reciprocal wave transmission characteristics of microwave device 100, shown in FIGS. 1*a* and 1*b*, renders it capable of operating as a microwave oscillator in the manner described. However, these reciprocal wave transmission characteristics prevent microwave device 100 from operating as a microwave amplifier, since a microwave amplifier requires nonreciprocal wave transmission characteristics, i.e., transmission in only the direction from input to output.

FIG. 2 shows a modification of the device shown in FIGS. 1*a* and 1*b* which renders it capable of operating as a microwave amplifier. In particular, the structure shown in FIG. 2 is identical with that shown in FIGS. 1*a* and 1*b* except that microwave device 200 of FIG. 2 includes a slab of magnetized ferrite material 216 in cooperative relationship with the negative resistance loaded slow wave structure. The direction of magnetization of ferrite material 216 is such as to render the wave transmission characteristics of the negative resistance loaded slow wave structure nonreciprocal, so that wave transmission is permitted only in a direction from left to right, but not from right to left. Although in FIG. 2, a magnetized ferrite slab is used to provide nonreciprocal transmission, any other microwave technique known in the art for rendering wave transmission nonreciprocal may be employed.

In the embodiment to FIG. 2, an RF input of microwave energy to be amplified having a frequency corresponding to a wavelength within the pass band defined by the above set forth formula is launched at the left-hand finger electrode of microwave device 200 by coupling means, not shown; the launched wave travels from left to right over the negative resistance loaded slow wave structure of microwave device 200 experiencing gain during its travel, and an amplified RF output from this wave is obtained at the right hand finger electrode of microwave device 200 by suitable microwave output coupling means, not shown.

FIGS. 3*a* and 3*b* show an alternative embodiment of a negative resistance loaded slow wave structure from that of the interdigital line shown in FIGS. 1*a* and 1*b*. In particular, microwave device 300 is composed of a metal meander line 302 spaced from a highly conductive ground plane 304 by an active semiconductor material 306, such as GaAs, in the manner shown in FIG. 3*b*. The spacing between meander line 300 and highly conductive ground plane 304, which is equal to the thickness of active semiconductor material 306, is the dimension *t*. The periodicity of the meander line 302 is the dimension D, the width of the meander line is the dimension s, the longitudinal spacing between successive arms of the meander line is the dimension W, and the height of each arm of the meander line is the dimension A, all of which are shown in FIG. 3*a*.

DC voltage supply 308, which is similar to supply 114, provides a predetermined DC voltage between metal meander line 302 and highly conductive ground plane 304 which produces an electric field across the thickness of active semiconductor material 306 sufficient to bias material 306 into a region of negative differential mobility at the operating frequency so that the meander line slow wave structure will be loaded with a negative resistance. Further, the carrier concentration of active semiconductor material 306 is such that the product of the carrier concentration and the thickness *t* is less than $10^{12}$/cm.$^{2}$, to thereby prevent domain formation in microwave device 300. The dimensions D, S, W and A of microwave device 300, shown in FIGS. 3*a* and 3*b* are chosen to support the transmission of oscillations at a chosen microwave frequency in the longitudinal direction from either left to right or right to left, in a manner similar to the selection of these dimensions in microwave device 100 of FIGS. 1*a* and 1*b*, discussed above.

From a conceptual point of view, the basic difference between microwave device 100 and microwave device 300 is that in microwave device 100 both the applied DC field and the direction of travel of the AC oscillation are longitudinal while in microwave device 300 the applied DC field is in a transverse direction and only the travelling microwave AC oscillation is in a longitudinal direction. One of the things that microwave device 300 has in common with microwave device 100 is that the same electrodes provide boundary conditions for both the applied DC electric field and the transmission of AC wave energy.

The fact that microwave device 300, when properly biased, is a negative resistance loaded slow wave structure causes it to produce negative attenuation, or gain, in a wave of appropriate frequency travelling in either direction between the left and right ends thereof.

Although not specifically shown, microwave device 300 may be modified to transmit waves in only one direction by the use of a magnetized ferrite slab in a manner similar to that described above in connection with FIG. 2, to thereby operate as a microwave amplifier.

Referring now to FIGS. 4*a* and 4*b*, microwave device 400 comprises insulating substrate of GaAs 402 having a mesa of epitaxially grown semiconducting n-GaAs 404 formed down the center thereof. As indicated in FIG. 4*b*, the thickness of the semiconductor is *d*. The thickness *d* and the electron density, *n*, of the GaAs epitaxial layer are established to conform to the condition that the product of *n* and *d* is no greater than $1.6\times10^{11}$cm.$^{12}$ in order to inhibit domain formation when the GaAs is biased into the negative resistance region thereof.

Both insulating GaAs 402 and semiconducting GaAs 404 are covered with a thin insulating layer 406 of $Al_2O_3$ (having a thickness *a* in the order of 1 or 2 microns).

A chrome-gold meander line 408, having a periodicity D is then formed on the $Al_2O_3$ by vapor deposition and photoetch techniques. Semiconducting GaAs 404, which is separated from meander line 408 by a thin layer of $Al_2O_3$, forms a center strip under the axis of the slow wave structure formed by meander line 408.

DC voltage supply 410 has one terminal thereof coupled to contact 412 at the left end of semiconducting GaAs 404 and the other terminal thereof coupled to contact 414 at the right end of semiconducting GaAs 404. DC voltage supply 410 provides a sufficient voltage to bias semiconducting GaAs 404 into its negative resistance region. In practice, a threshold field of at least 3kv./cm. is required, and the periodicity D may be 50 microns, i.e., 25 microns between successive adjacent legs of meander line 408. This is readily achieved with present photoetch techniques.

The electron density *n* may be about $1.6\times10^{15}$cm.$^{13}$. The carrier drift velocity may be about $2\times10^7$cm./sec. The length of each leg 416 depends on the desired cutoff frequency. For a length of leg 416 of 1.34 mm., a cutoff frequency of 50 GHz. is obtained while, for a length of leg 416 of only 0.835 mm., a cutoff frequency of 80 GHz. is obtained. Further, the dimension of meander line 408 corresponding to the dimension *s* of meander line 302 in microwave device 300 of FIG. 3*a* is in the order of 2 microns.

Microwave device 400 may be operated as a microwave oscillator with an oscillator output being obtained therefrom in the manner of microwave device 300 or, by making the wave transmission direction nonreciprocal by the use of a magnetized ferrite slab in the manner described in connection with FIG. 2, microwave device 400 may be operated as a microwave amplifier.

What is claimed is:

1. A negative resistance loaded slow wave microwave device comprising a slab having a surface of given dimensions parallel to the length and width of said slab, said slab including a longitudinal center portion composed of a semiconducting material of given thickness which exhibits negative differential carrier mobility when a given value longitudinal biasing electric field is applied thereto, the product of said given thickness and the density of carriers within said semiconducting material being below the threshold amount required to permit domains from forming within said semiconducting material in response to said biasing electric field, said slab further including a longitudinal outer portion situated contiguously on either side of said center portion which outer portions are composed of an insulating material, a metal meander line of predetermined periodicity oriented in proximity to said surface of said slab in interactive cooperative relationship with said semiconducting material to provide a slow wave structure for propagating a wave in a direction parallel to the length of said slab at a phase velocity which is significantly higher and asynchronous with the carrier drift velocity within said semiconducting material when said biasing field is applied, and electrode means at either end of said slab for applying said longitudinal biasing field.

2. The microwave device defined in claim 1, wherein said slab comprises an insulating substrate having a mesa of epitaxially grown semiconducting n-GaAs formed down the center thereof.

3. The microwave device defined in claim 1, wherein said meander line is separated from said surface of said slab by a thin insulating layer of $Al_2O_3$ which is in contact with both said surface of said slab and said meander line.

4. The microwave device defined in claim 1, wherein said meander line comprises a plurality of parallel spaced legs oriented parallel to the width of said surface each of which extends from one of said outer portions across said center portion to the other of said outer portions of said slab, one end of each individual one of said legs being conductively connected to one end of the next succeeding one of said legs by conductive means situated in proximity to one of said outer portions of said slab and the other end of that individual one of said legs being connected to the other end of the next preceding one of said legs by conductive means in proximity to the other one of said outer portions of said slab.

5. The microwave device defined in claim 4, wherein the spacing between adjacent legs of said meander line is substantially equal to 25 microns.

6. The microwave device defined in claim 5, wherein the length of each leg is between 0.835 millimeters and 1.34 millimeters and the width of each leg is about 2 microns.

7. The microwave device defined in claim 4, wherein said meander line is formed of chrome-gold.